United States Patent
Lee et al.

(10) Patent No.: US 11,355,801 B2
(45) Date of Patent: Jun. 7, 2022

(54) ELECTROLYTE MEMBRANE FOR LITHIUM AIR BATTERY HAVING GOOD DURABILITY, METHOD OF MANUFACTURING SAME AND LITHIUM AIR BATTERY INCLUDING SAME

(71) Applicants: Hyundai Motor Company, Seoul (KR); Kia Motors Corporation, Seoul (KR)

(72) Inventors: Jae Seung Lee, Gyeonggi-do (KR); Jun Ki Rhee, Gyeonggi-do (KR); Ho Taek Lee, Seoul (KR); Sam Ick Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 16/701,580

(22) Filed: Dec. 3, 2019

(65) Prior Publication Data
US 2020/0373639 A1 Nov. 26, 2020

(30) Foreign Application Priority Data
May 24, 2019 (KR) .................. 10-2019-0061306

(51) Int. Cl.
*H01M 12/02* (2006.01)
*H01M 12/08* (2006.01)
*H01M 50/409* (2021.01)
*H01M 50/446* (2021.01)

(52) U.S. Cl.
CPC ........... *H01M 12/02* (2013.01); *H01M 12/08* (2013.01); *H01M 50/409* (2021.01); *H01M 50/446* (2021.01); *H01M 2300/0045* (2013.01); *H01M 2300/0082* (2013.01); *H01M 2300/0085* (2013.01); *H01M 2300/0091* (2013.01)

(58) Field of Classification Search
CPC ................ H01M 12/02; H01M 12/08; H01M 2300/0045; H01M 2300/0082; H01M 2300/0085; H01M 2300/0091; H01M 50/446; H01M 50/409
See application file for complete search history.

(56) References Cited

U.S. PATENT DOCUMENTS

| | | | | |
|---|---|---|---|---|
| 10,700,400 B2* | 6/2020 | Ryou | ................. | H01M 50/543 |
| 2009/0311567 A1* | 12/2009 | Visco | .................... | H01M 4/382 |
| | | | | 429/403 |
| 2014/0170465 A1* | 6/2014 | Visco | .................... | H01M 50/46 |
| | | | | 429/144 |
| 2015/0132670 A1* | 5/2015 | Nagayama | ............ | H01M 12/08 |
| | | | | 429/407 |

(Continued)

FOREIGN PATENT DOCUMENTS

KR 20130008830 A 1/2013

*Primary Examiner* — Matthew J Merkling
(74) *Attorney, Agent, or Firm* — Fox Rothschild LLP; Peter F. Corless (57) ABSTRACT

Disclosed are an electrolyte membrane for a lithium air battery having good durability, a method of manufacturing the same, and a lithium air battery including the same. The electrolyte membrane for a lithium air battery may include a reinforced membrane and an electrolyte solution and is thus nonvolatile and capable of ensuring sufficient physical strength.

16 Claims, 4 Drawing Sheets

(56) References Cited

U.S. PATENT DOCUMENTS

| | | | |
|---|---|---|---|
| 2015/0155566 A1* | 6/2015 | Kim | H01M 4/88 |
| | | | 252/514 |
| 2016/0111730 A1* | 4/2016 | Kim | H01M 8/186 |
| | | | 429/405 |
| 2017/0018802 A1* | 1/2017 | Omoda | H01M 4/5825 |
| 2017/0018827 A1* | 1/2017 | Suyama | H01M 4/38 |
| 2017/0222244 A1* | 8/2017 | Kim | H01M 10/0565 |
| 2017/0288281 A1* | 10/2017 | Chiang | H01M 50/431 |

* cited by examiner

ELECTROLYTE MEMBRANE FOR LITHIUM AIR BATTERY HAVING GOOD DURABILITY, METHOD OF MANUFACTURING SAME AND LITHIUM AIR BATTERY INCLUDING SAME

CROSS REFERENCE TO RELATED APPLICATION

The present application claims priority based on Korean Patent Application No. 10-2019-0061306, filed on May 24, 2019, the entire content of which is incorporated herein for all purposes by this reference.

TECHNICAL FIELD

The present invention relates to an electrolyte membrane for a lithium air battery having good durability, a method of manufacturing the same, and a lithium air battery including the same.

BACKGROUND OF THE INVENTION

Typically, a lithium air battery is configured to include an anode, a cathode including an oxidation-reduction catalyst of oxygen using oxygen in the air as a cathode active material, and a lithium ion conductive electrolyte between the cathode and the anode.

Unlike conventional lithium ion batteries, the lithium air battery has a structure in which external gas such as oxygen flows into and out of the cell, and thus a volatile solvent such as an electrolyte typically used in a lithium ion battery cannot be used. Hence, a nonvolatile electrolyte is basically required as the electrolyte for a lithium air battery.

Moreover, since the cathode requires the supply of oxygen, a porous substrate has to be used, and also, the use of a nonvolatile electrolyte that is able to function as an ion transfer carrier for transferring ions received from the anode is required.

SUMMARY OF THE INVENTION

In preferred aspects, provided is an electrolyte membrane for a lithium air battery, which may include a gel-type nonvolatile electrolyte and may ensure sufficient physical strength.

In addition, provided is an electrolyte membrane for a lithium air battery, which may have superior reduction resistance and chemical resistance to the lithium ions of an anode and superior oxidation resistance to the high potential of a cathode.

The objectives of the present invention are not limited to the foregoing, and will be able to be clearly understood through the following description and to be realized by the means described in the claims and combinations thereof.

In an aspect, provided is an electrolyte membrane for a lithium air battery, which may include a reinforced membrane including pores. Particularly, the pores in the reinforced membrane may be impregnated with a polymer and an electrolyte solution, and the electrolyte solution may include an ionic liquid and a lithium salt.

The term "ionic liquid", as used herein, refers to a solvent including only ionic species, or a liquid salt consisting of ions (cations and anions). Exemplary ionic liquid in the present invention may include cations such as quaternary ammonium, imidazolium, pyridinum, pyrrolidinium, and quaternary phosphonium, but anions may not be particularly limited. In addition, exemplary ionic liquid may include anions such as halide, tetrahalogenoaluminate (e.g., $AlF_4^-$), hexahalogenophosphate (e.g., $PF6^-$), tetrahalogenoborate (e.g., $BF_4^-$), bis(sulfonyl)imide, or nitrate ($NO_3^-$), but cations may not be particularly limited.

The term "lithium salt" as used herein refers to a compound including lithium cation (e.g., Li+) and counter anion (e.g., halide, organic or inorganic acid, or ligand). Preferred lithium salts may suitably lithium nitrate ($LiNO_3$), lithium bis(trifluoromethanesulfonyl)imide (LiTFSI), lithium (trifluoromethane)sulfoneimide (LiFSI), or a combination thereof.

The pores in the reinforced membrane may be further impregnated with an additive.

The polymer may suitably include an ionic conductive polymer, the ionic conductive polymer including one or more selected from the group consisting of polydiallyldimethyl ammonium chloride (PDDA), bis(trifluoromethanesulfonyl)imide (TFSI), and bis(fluorosulfonyl)imide (FSI).

The polymer may include a nonionic conductive polymer. The nonionic conductive polymer may suitably include one or more selected from the group consisting of polyvinylidene fluoride (PVdF), polymethyl methacrylate (PMMA), polyethylene oxide (PEO), and polystyrene (PS).

The reinforced membrane may suitably include one or more selected from the group consisting of polyethylene (PE), polyethylene terephthalate (PET), polytetrafluoroethylene (PTFE), polyvinylidene fluoride (PVdF), polyimide (PI), cellulose, glass fiber (GF), ceramic-coated polyethylene (ceramic-coated PE), ceramic-coated polyethylene terephthalate (ceramic-coated PET), and ceramic-coated polypropylene (ceramic-coated PP).

The ionic liquid may suitably include a cation and an anion. The cation may suitably include one or more selected from the group consisting of 1-ethyl-3-methylimidazolium (EMIM), 1-butyl-3-methylimidazolium (BMIM), 1,3-dimethylimidazolium (MMIM), 1-butyl-1-methylpyrrolidinium ($PYR_{14}$), N-propyl-N-methylpyrrolidinium ($PYR_{13}$), trimethylpropylammonium ($N_{1113}$), butyltrimethylammonium ($N_{1114}$), and N-methyl-N-butylpiperidinium ($PP_{14}$). The anion may suitably include one or more selected from the group consisting of chloride (Cl), dicyanamide (DCA), trifluoromethanesulfonate (Otf), trifluoromethyl sulfonylimide (TFSI), acetate (Ac), hydroxide (OH), and diethyl phosphate (DEP).

The additive may suitably include one or more selected from the group consisting of cesium iodide (CsI), lithium iodide (LiI), lithium nitrate ($LiNO_3$), and ammonium ($NH_4$).

The polymer may be used in an amount of about 20 to 200 parts by weight based on 100 parts by weight of the ionic liquid.

The lithium salt may be used in an amount of about 10 to 100 parts by weight based on 100 parts by weight of the ionic liquid.

The additive may be used in an amount of about 0.1 to 10 parts by weight based on 100 parts by weight of the ionic liquid.

The reinforced membrane may have a porosity of about 30 to 95%.

The reinforced membrane may have a thickness of about 3 to 100 μm.

The contact angle of the electrolyte solution with the reinforced membrane may range from about 5 to about 90°.

The electrolyte membrane may have a thickness of about 5 to 200 μm.

In an aspect, provided is a lithium air battery. The lithium air battery may include a cathode, an anode, and the above electrolyte membrane disposed between the cathode and the anode. Particularly, the electrolyte membrane may include a cathode side facing the cathode and an anode side facing the anode, the electrolyte membrane may be folded in a zigzag form, the cathode may be stacked by being inserted into folds of the cathode side of the electrolyte membrane, the anode may be stacked by being inserted into folds of the anode side of the electrolyte membrane. Preferably, the cathode, the anode and the electrolyte membrane may be provided in a case.

The case may include openings in one of the sides thereof and in the side opposite the one side so as to allow external air to pass therethrough, and the external air may be allowed to flow into and out of the case in a direction crossing the direction in which the cathode, the anode and the electrolyte membrane are stacked.

The cathode may include a porous substrate, and the length of the electrolyte membrane may be equal to or less than the length of the porous substrate included in the cathode.

Accordingly, provided is an electrolyte membrane for a lithium air battery, which includes a gel-type nonvolatile electrolyte and is able to ensure sufficient physical strength.

Also provided is an electrolyte membrane for a lithium air battery, which has superior reduction resistance and chemical resistance to the lithium ions of an anode and superior oxidation resistance to the high potential of a cathode.

The effects of the present invention are not limited to the foregoing, and should be understood to include all effects that can be reasonably anticipated from the following description.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present invention pertains to an electrolyte membrane for a lithium air battery, including a porous reinforced membrane, in which pores in the reinforced membrane are impregnated with a polymer and an electrolyte solution, and to a method of manufacturing the same.

Electrolyte Membrane for Lithium Air Battery

The electrolyte membrane for a lithium air battery may include a porous reinforced membrane, in which the pores in the reinforced membrane may be impregnated with a polymer and an electrolyte solution and the electrolyte solution may include an ionic liquid and a lithium salt.

The reinforced membrane may be a porous membrane, for example, including pores, and may include one or more selected from the group consisting of polyethylene (PE), polyethylene terephthalate (PET), polytetrafluoroethylene (PTFE), polyvinylidene fluoride (PVdF), polyimide (PI), cellulose, glass fiber (GF), ceramic-coated polyethylene (ceramic-coated PE), ceramic-coated polyethylene terephthalate (ceramic-coated PET), and ceramic-coated polypropylene (ceramic-coated PP). Preferably, the reinforced membrane may include one or more selected from the group consisting of ceramic-coated PE, ceramic-coated PET, and ceramic-coated PP.

For the ceramic-coated reinforced membrane, one or both sides of the reinforced membrane may be coated. Here, the ceramic coating may increase heat resistance to thus suppress deformation due to heat.

The reinforced membrane may have a porosity of about 30 to 95%, and preferably about 45 to 90%. When the porosity thereof is less than about 30%, impregnation with the ionic liquid may become difficult and ionic conductivity may decrease. On the other hand, when the porosity thereof is greater than about 95%, it is difficult to ensure the mechanical strength required of the electrolyte membrane, and short-circuiting problems may occur due to the formation of lithium dendrites upon charging and discharging of a battery.

The thickness of the reinforced membrane may be in the range of about 3 to 100 μm. When the thickness thereof is less than about 3 μm, it is difficult to ensure mechanical strength. On the other hand, when the thickness thereof is greater than about 100 μm, ionic conductivity may decrease.

The electrolyte solution may suitably include an ionic liquid and a lithium salt.

The ionic liquid as used herein may increase the conductivity of lithium ions in the electrolyte membrane, and the ionic liquid may include a cation and an anion. Here, the cation may suitably include one or more selected from the group consisting of 1-ethyl-3-methylimidazolium (EMIM), 1-butyl-3-methylimidazolium (BMIM), 1,3-dimethylimidazolium (MMIM), 1-butyl-1-methylpyrrolidinium ($PYR_{14}$), N-propyl-N-methylpyrrolidinium ($PYR_{13}$), trimethylpropylammonium ($N_{1113}$), butyltrimethylammonium ($N_{1114}$), and N-methyl-N-butylpiperidinium ($PP_{14}$). the anion may suitably include one or more selected from the group consisting of chloride (Cl), dicyanamide (DCA), trifluoromethanesulfonate (Otf), trifluoromethyl sulfonylimide (TFSI), acetate (Ac), hydroxide (OH), and diethyl phosphate (DEP).

The lithium salt as used herein may increase the conductivity of lithium ions generated at the anode, and the kind thereof is not particularly limited in the present invention, and any lithium salt may be used so long as it is typically useful in the field of lithium air batteries. Preferably, the lithium salt may include one or more selected from the group consisting of lithium nitrate ($LiNO_3$), lithium bis(trifluoromethanesulfonyl)imide (LiTFSI), and lithium (trifluoromethane)sulfoneimide (LiFSI).

The lithium salt may be used in an amount of about 10 to 100 parts by weight, and preferably about 20 to 80 parts by weight, based on 100 parts by weight of the ionic liquid. When the amount of the lithium salt is less than about 10 parts by weight, cell performance may deteriorate. On the other hand, when the amount thereof is greater than about 100 parts by weight, complete dissolution of the lithium salt in the ionic liquid may become difficult, thus making it difficult to prepare an electrolyte solution.

The concentration of the lithium salt preferably may be in the range of about 0.2 to 4 M.

The contact angle of the electrolyte solution with the reinforced membrane may range from about 5 to about 90°, and preferably of about 20 to 80°. When the contact angle thereof is less than about 5°, flow of the electrolyte solution may become excessively large, making it difficult to form an electrolyte membrane. On the other hand, when the contact angle thereof is greater than about 90°, impregnation with the electrolyte solution may become difficult and ionic conductivity may decrease, which is undesirable.

In the present invention, the contact angle is an angle with the reinforced membrane when a straight line is drawn to a liquid surface from the point at which the electrolyte solution in a stationary phase on the surface of the reinforced membrane comes into contact with the reinforced membrane, and the contact angle may be measured through a typical method. For example, the angle may be measured based on an image obtained by photographing a contact portion between the reinforced membrane and the ionic liquid dropped on the reinforced membrane using a pipette or the like, when viewed from the lateral side.

The polymer as used herein may maintain the shape of the electrolyte membrane in a gel phase and to prevent the flow thereof.

The polymer may suitably include one or more of an ionic conductive polymer, a nonionic conductive polymer.

The ionic conductive polymer may suitably include one or more selected from the group consisting of polydiallyldimethyl ammonium chloride (PDDA), bis(trifluoromethanesulfonyl)imide (TFSI), bis(fluorosulfonyl)imide (FSI) and combinations thereof, and the nonionic conductive polymer may include any one selected from the group consisting of polyvinylidene fluoride (PVdF), polymethyl methacrylate (PMMA), polyethylene oxide (PEO), and polystyrene (PS).

The polymer may be used in an amount of about 20 to 200 parts by weight, and preferably about 30 to 140 parts by weight, based on 100 parts by weight of the ionic liquid. When the amount of the polymer is less than about 20 parts by weight, it is difficult to prevent the flow of the electrolyte membrane. On the other hand, when the amount thereof is greater than about 200 parts by weight, ionic conductivity may significantly decrease.

The pores in the reinforced membrane may be further impregnated with an additive. The additive as used herein may increase charging and discharging efficiency of the lithium air battery and to improve the durability of the electrolyte membrane, and may include one or more selected from the group consisting of cesium iodide (CsI), lithium iodide (LiI), lithium nitrate ($LiNO_3$), and ammonium ($NH_4$).

The additive may be used in an amount of about 0.1 to 10 parts by weight based on 100 parts by weight of the ionic liquid. When the amount thereof is less than about 0.1 parts by weight, the improvement in the durability of the electrolyte membrane may become insignificant. On the other hand, when the amount thereof is greater than about 10 parts by weight, it is difficult to manufacture an electrolyte membrane.

The thickness of the electrolyte membrane for a lithium air battery according to an exemplary embodiment of the present invention, including the reinforced membrane, the electrolyte solution and the additive, may range from about 5 to about 200 μm. When the thickness thereof is less than about 5 μm, it is difficult to ensure mechanical strength and short-circuiting problems may occur during operation of a battery. On the other hand, when the thickness thereof is greater than about 200 μm, ionic conductivity may decrease, undesirably deteriorating the performance of the battery.

Lithium Air Battery

According to an exemplary embodiment of the present invention, the lithium air battery includes a cathode, an anode and an electrolyte membrane disposed between the cathode and the anode. Particularly, the electrolyte membrane may be stacked by being interposed between the cathode and the anode, and the electrolyte membrane may include a cathode side facing the cathode and an anode side facing the anode. The cathode may be stacked by being inserted into folds of the cathode side of the electrolyte membrane, and the anode may be stacked by being inserted into folds of the anode side of the electrolyte membrane. Furthermore, the cathode, the anode and the electrolyte membrane may be provided in a case.

The porous substrate of the cathode may include one or more selected from the group consisting of graphite, carbon black, Ketjen black, acetylene black, carbon nanotubes, and reduced graphene oxide.

The pores in the porous substrate may be impregnated with an electrolyte solution suitably including one or more selected from the group consisting of a polymer, an ionic liquid, and a lithium salt in order to electrically conduct lithium ions. Here, the polymer, the ionic liquid and the lithium salt may be the same as those applied to the electrolyte membrane described above. For example, the polymer may suitably include one or more of an ionic conductive polymer, and a nonionic conductive polymer. The ionic conductive polymer may suitably include one or more selected from the group consisting of polydiallyldimethyl ammonium chloride (PDDA), bis(trifluoromethanesulfonyl)imide (TFSI), and bis(fluorosulfonyl)imide (FSI), and the nonionic conductive polymer may suitably include one or more selected from the group consisting of polyvinylidene fluoride (PVdF), polymethyl methacrylate (PMMA), polyethylene oxide (PEO), and polystyrene (PS).

The ionic liquid may include one or more selected from the group consisting of ethylmethylimidazolium (EMIM), butylmethylimidazolium (BMIM), dimethylimidazolium (MMIM), butylmethylpyrrolidinium ($PYR_{14}$), trimethylpropylammonium ($N_{1113}$), butyltrimethylammonium ($N_{1114}$), N-methyl-N-butylpiperidinium ($PP_{14}$), N-propyl-N-methylpyrrolidinium ($PYR_{13}$), chloride (Cl), dicyanamide (DCA), trifluoromethane sulfonate (Off), trifluoromethyl sulfonylimide (TFSI), acetate (Ac), hydroxide (OH), and diethyl phosphate (DEP).

The anode may include a current collector, and is specifically configured such that lithium is provided on both sides of the current collector. Particularly, the current collector may be used without particular limitation, so long as it is typically useful in the field of secondary batteries and is able to conduct electrons.

The lithium contained in the anode may include, for example, a lithium-based metal oxide or a lithium alloy. Also, any material may be used as the anode for a lithium air battery, so long as it is able to produce lithium ions.

A description of the specific configuration of the electrolyte membrane overlaps the above description for the lithium air battery and is thus omitted.

The case may include openings in one of the sides thereof and in the side opposite the one side so as to allow external air to pass therethrough. Particularly, the external air may be allowed to flow into and out of the case in a direction crossing the direction in which the cathode, the anode and the electrolyte membrane may be stacked.

Figure 1:
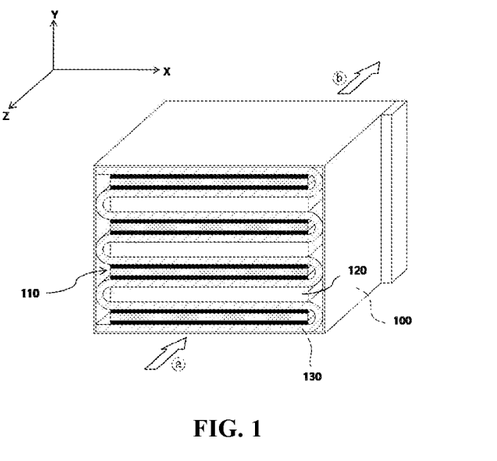
FIG. 1 shows an exemplary stacking structure of an anode, a cathode and an electrolyte membrane in a case having openings therein according to an exemplary embodiment of the present invention.

FIG. 1 shows an anode 120, a cathode 110 and an electrolyte membrane 130, which are stacked in a case having openings therein. With reference thereto, openings may be formed in opposite sides of the case 100 in the z-axis direction, and the electrolyte membrane 130 may be stacked while being folded in the x-axis direction.

Particularly, the electrolyte membrane 130 may be provided in the form of a long rectangular ribbon, and a long side and a short side, among the sides of the ribbon-shaped electrolyte membrane, may be defined as a width side and a length side, respectively. When the electrolyte membrane 130 is folded in the case 100, the electrolyte membrane 130 may be stacked such that the width side thereof may be directed toward the openings.

The anode 120 and the cathode 110, between which the electrolyte membrane 130 is interposed, may be alternately inserted into the folds of the electrolyte membrane 130. Particularly, the electrolyte membrane 130 may include an anode side facing and contacting the anode 120 and a cathode side facing and contacting the cathode 110. When the electrolyte membrane 130 is folded in multiple layers, spaces in which the anode 120 and the cathode 110 may be alternately inserted into folds of the anode side and the cathode side are formed. Particularly, the anode 120 and the cathode 110 may be stacked in a manner of being alternately inserted into the folded spaces in the anode side and the cathode side, which may be formed by folding the electrolyte membrane 130 in a zigzag form.

When the anode 120, the cathode 110 and the electrolyte membrane 130 are stacked, the length of the electrolyte membrane 130, the length of the porous substrate 112 included in the cathode 110, the length of the cathode material 111 included in the cathode 110 and the length of the anode 120 may be different from each other. Here, the porous substrate 112 may be impregnated with the cathode material 111.

The cathode material 111 may be used without particular limitation, so long as the porous substrate 112 of the cathode 110 may be impregnated therewith in the field of lithium air batteries.

Figure 2:
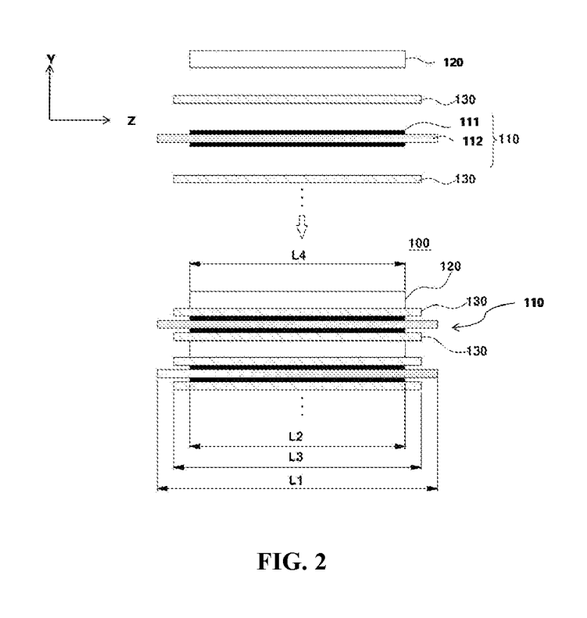
FIG. 2 shows the results of comparison of lengths of an exemplary anode, an exemplary cathode and an exemplary electrolyte membrane according to an exemplary embodiment of the present invention.

FIG. 2 schematically shows the difference in lengths of the anode 120, the cathode 110 and the electrolyte membrane 130 according to an exemplary embodiment of the present invention. With reference thereto, the length L1 of the porous substrate 112, the length L2 of the area in which the porous substrate 112 is impregnated with the cathode material 111, the length L3 of the length side of the electrolyte membrane 130, and the length L4 of the anode 120, in a z-axis direction, namely the direction of the openings in the case 100, satisfy the relationship of Equation 1 below (when an insertion direction upon inserting the porous substrate 112 into the zigzag-folded electrolyte membrane 130 and a direction crossing the insertion direction are defined as a longitudinal direction and a transverse direction, respectively, the length L1 of the porous substrate 112 designates the length of the porous substrate 112 in a transverse direction).

$$L2 \leq L4 < L3 \leq L1 \quad \text{[Equation 1]}$$

Particularly, the length L3 of the length side of the electrolyte membrane 130 may be less than or equal to the length L1 of the porous substrate 112. Thereby, external air may be sufficiently supplied to the cathode material 111 along the protruding porous substrate 112.

A better understanding of the present invention will be given through the following examples, which are merely set forth to illustrate the present invention but are not to be construed as limiting the scope of the present invention.

EXAMPLE

Examples 1 to 15

Manufacture of Electrolyte Membrane

A reinforced membrane, an ionic liquid, a lithium salt and a polymer were prepared as shown in Table 1 below. A slurry comprising 50 wt % of the ionic liquid, 20 wt % of the lithium salt and 30 wt % of the polymer, based on the total weight of the slurry, was prepared.

TABLE 1

| Example | Reinforced membrane | Porosity (%) | Ionic liquid | Lithium salt | Polymer |
|---|---|---|---|---|---|
| 1 | Single-sided ceramic-coated PE | 47 | $P_{14}$-TFSI | 0.5M LiTFSI | PDDA |
| 2 | Single-sided ceramic-coated PE | 47 | EMIM-TFSI | 0.5M LiTFSI | PDDA |
| 3 | Single-sided ceramic-coated PE | 47 | $P_{14}$-TFSI | 1.5M LiTFSI | PDDA |
| 4 | PE | 50 | $P_{14}$-TFSI | 0.5M LiTFSI | PDDA |
| 5 | PE | 50 | EMIM-TFSI | 0.5M LiTFSI | PDDA |
| 6 | PE | 50 | $P_{14}$-TFSI | 1.5M LiTFSI | PDDA |
| 7 | PP | 50 | $P_{14}$-TFSI | 0.5M LiTFSI | PDDA |
| 8 | PP | 50 | EMIM-TFSI | 0.5M LiTFSI | PDDA |
| 9 | PP | 50 | $P_{14}$-TFSI | 1.5M LiTFSI | PDDA |
| 10 | Glass fiber | 70 | $P_{14}$-TFSI | 0.5M LiTFSI | PDDA |
| 11 | Glass fiber | 70 | EMIM-TFSI | 0.5M LiTFSI | PDDA |
| 12 | Glass fiber | 70 | $P_{14}$-TFSI | 1.5M LiTFSI | PDDA |
| 13 | PI | 70 | $P_{14}$-TFSI | 0.5M LiTFSI | PDDA |
| 14 | PI | 70 | EMIM-TFSI | 0.5M LiTFSI | PDDA |
| 15 | PI | 70 | $P_{14}$-TFSI | 1.5M LiTFSI | PDDA |

Examples 16 to 19

Manufacture of Lithium Air Battery

A lithium air battery was manufactured using a lithium foil as an anode, a copper plate as an anode current collector, a thermally treated carbon nanocage (CNC) as a cathode, and an electrolyte membrane comprising a reinforced membrane, an ionic liquid, a lithium salt and a polymer as shown in Table 2 below.

TABLE 2

| Example | Polymer (30 wt %) | Ionic liquid (50 wt %) | Lithium salt (20 wt %) | Reinforced membrane (Thickness) |
|---|---|---|---|---|
| 16 | PDDA-TFSI | EMIM-TFSI | 0.5M LiTFSI | Single-sided ceramic-coated PE (20 μm) |
| 17 | PDDA-TFSI | EMIM-TFSI | 0.5M LiTFSI | Single-sided ceramic-coated PE (11 μm) |
| 18 | PDDA-TFSI | EMIM-TFSI | 0.5M LiTFSI | Double-sided ceramic-coated PE (13 μm) |
| 19 | PDDA-TFSI | EMIM-TFSI | 0.5M LiTFSI | PE (9 μm) |

Test Example 1

The slurry prepared using the composition of Table 1 was applied on the reinforced membrane of each of Examples 1 to 15 and the contact angle was measured. The results are shown in Table 3 below.

TABLE 3

| Example | Contact angle |
|---|---|
| 1 | 65.4 |
| 2 | 63.6 |
| 3 | 78.3 |
| 4 | 64.1 |
| 5 | 58.1 |
| 6 | 69.7 |
| 7 | 64.7 |
| 8 | 61 |
| 9 | 76.5 |
| 10 | 42.2 |
| 11 | 42.1 |
| 12 | 53.2 |
| 13 | 41.7 |
| 14 | 36.3 |
| 15 | 50.5 |

Test Example 2

Measurement of Ionic Conductivity Depending on Temperature

The ionic conductivity was measured depending on the temperature of the lithium air battery of each of Examples 16 to 19. The results are shown in FIG. 3 and Table 4 below.

TABLE 4

| Example | Ionic conductivity (ms/cm@60° C.) | *tLi+ |
|---|---|---|
| 16 | 0.311 | 0.21 |
| 17 | 0.504 | 0.28 |
| 18 | 0.252 | 0.26 |
| 19 | 0.590 | 0.36 |

Figure 3:
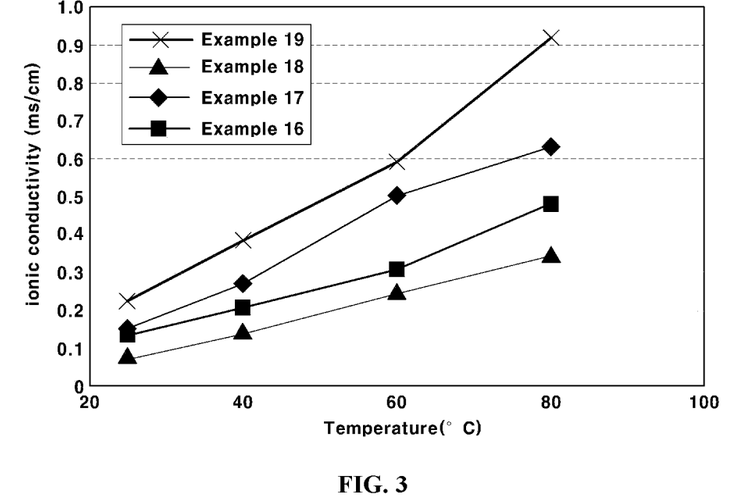
FIG. 3 is a graph showing changes in ionic conductivity depending on the temperature in Examples 16 to 19 according to an exemplary embodiment of the present invention.
Figure 4:
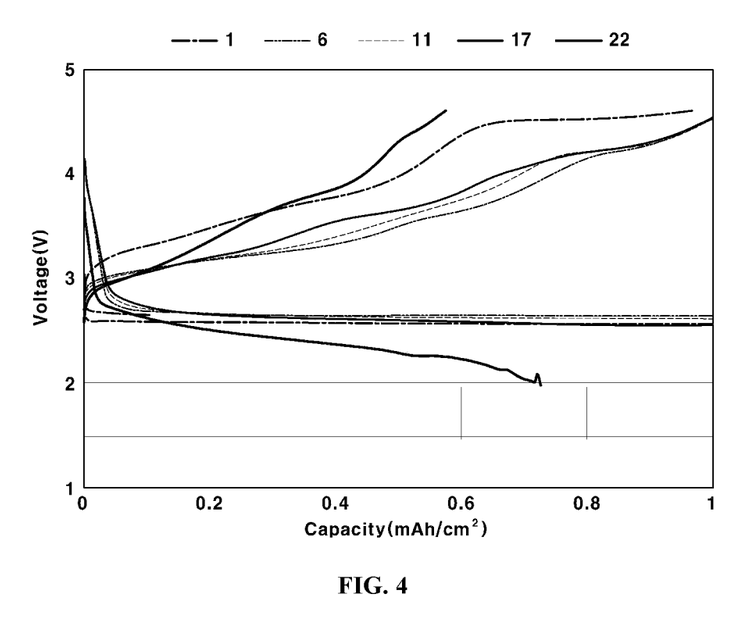
FIG. 4 is a graph showing the charging and discharging test results of Example 16 according to an exemplary embodiment of the present invention.
Figure 5:
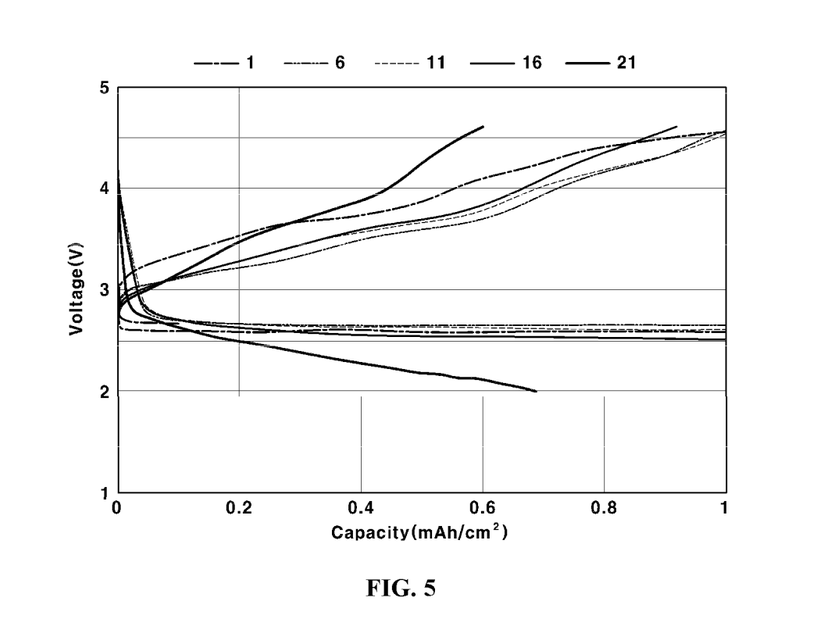
FIG. 5 is a graph showing the charging and discharging test results of Example 17 according to an exemplary embodiment of the present invention.
Figure 6:
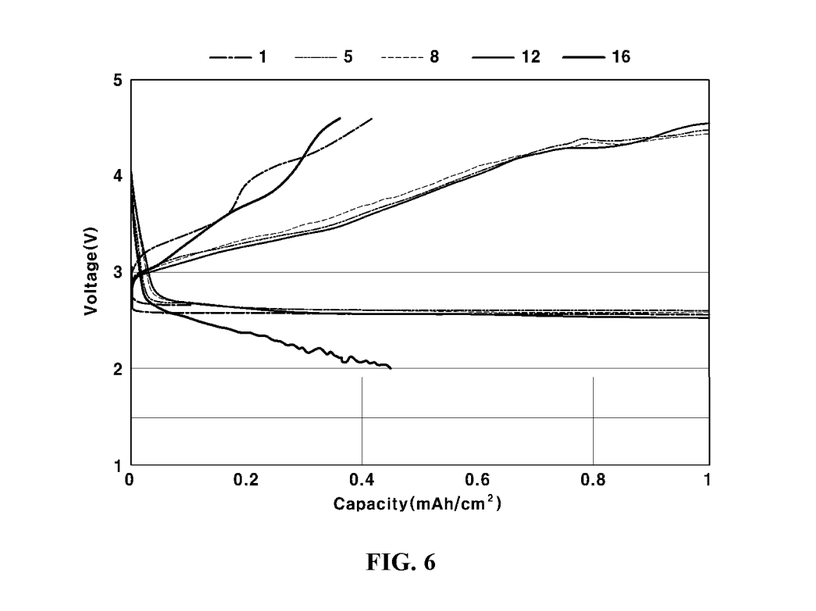
FIG. 6 is a graph showing the charging and discharging test results of Example 18 according to an exemplary embodiment of the present invention.
Figure 7:
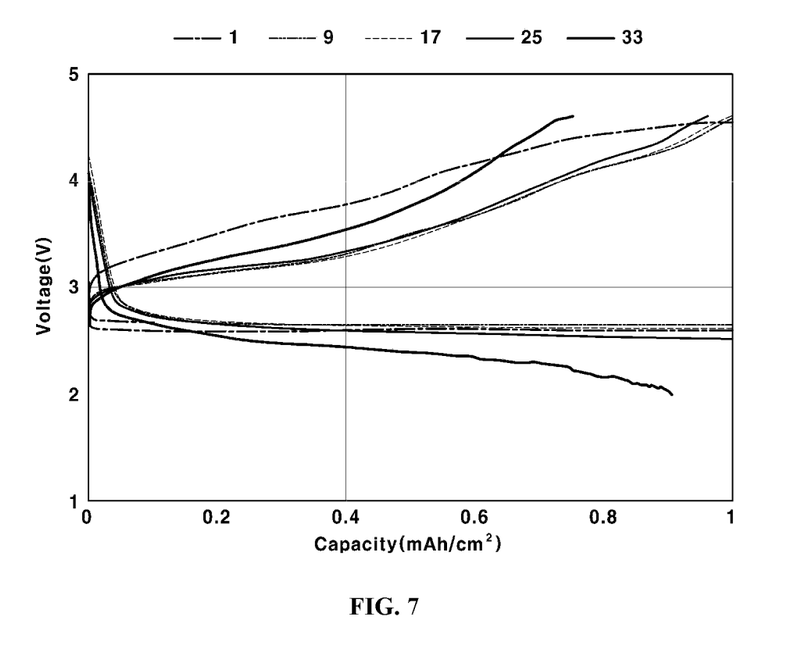
FIG. 7 is a graph showing the charging and discharging test results of Example 19 according to an exemplary embodiment of the present invention.

*tLi+: only ionic conductivity of lithium among ions in the electrolyte is represented As shown in FIG. 3, the ionic conductivity of the lithium air battery of each of Examples 16 to 19 was measured to be 0.2 ms/cm at a temperature of 60° C. or greater. In particular, when the reinforced membrane including ceramic-coated polyethylene (PE) was used, high ionic conductivity was exhibited.

Test Example 3

Measurement of Charging and Discharging Effects

The charging and discharging effects of the lithium air battery of each of Examples 16 to 19 were measured. The results thereof are graphed in FIGS. 4 to 7.

FIG. 4, FIG. 5, FIG. 6 and FIG. 7 show the results of Example 16, Example 17, Example 18 and Example 19, respectively. With reference thereto, in Example 19, using the electrolyte membrane having the highest ionic conductivity, the greatest charging/discharging durability was exhibited, and in Example 18, using the electrolyte membrane having relatively low ionic conductivity, charging/discharging durability was poor. Hence, it can be concluded that the durability of the lithium air battery improves with an increase in ionic conductivity.

Although exemplary embodiments of the present invention have been described with reference to the accompanying drawings, those skilled in the art will appreciate that the present invention may be embodied in other exemplary forms without changing the technical spirit or essential features thereof. Thus, the embodiments described above should be understood to be non-limiting and illustrative in every way.

What is claimed is:

1. An electrolyte membrane for a lithium air battery, comprising:
a reinforced membrane comprising pores,
wherein the pores in the reinforced membrane are impregnated with a polymer and an electrolyte solution, and
the electrolyte solution comprises an ionic liquid and a lithium salt,
wherein the polymer comprises an ionic conductive polymer comprising polydiallyldimethyl ammonium chloride (PDDA).

2. The electrolyte membrane of claim 1, wherein the pores in the reinforced membrane are further impregnated with an additive.

3. The electrolyte membrane of claim 1, wherein the polymer comprises a nonionic conductive polymer, and
the nonionic conductive polymer comprises one or more selected from the group consisting of polyvinylidene fluoride (PVdF), polymethyl methacrylate (PMMA), polyethylene oxide (PEO), and polystyrene (PS).

4. The electrolyte membrane of claim 1, wherein the reinforced membrane comprises one or more selected from the group consisting of polyethylene (PE), polyethylene terephthalate (PET), polytetrafluoroethylene (PTFE), polyvinylidene fluoride (PVdF), polyimide (PI), cellulose, glass fiber (GF), ceramic-coated polyethylene (ceramic-coated PE), ceramic-coated polyethylene terephthalate (ceramic-coated PET), and ceramic-coated polypropylene (ceramic-coated PP).

5. The electrolyte membrane of claim 1, wherein the ionic liquid includes a cation and an anion,
the cation comprises one or more selected from the group consisting of 1-ethyl-3-methylimidazolium (EMIM), 1-butyl-3-methylimidazolium (BMIM), 1,3-dimethylimidazolium (MMIM), 1-butyl-1-methylpyrrolidinium (PYR$_{14}$), N-propyl-N-methylpyrrolidinium (PYR$_{13}$), trimethylpropylammonium (N$_{1113}$), butyltrimethylammonium (N$_{1114}$), and N-methyl-N-butylpiperidinium (PP$_{14}$), and
the anion comprises one or more selected from the group consisting of chloride (Cl), dicyanamide (DCA), trifluoromethanesulfonate (Otf), trifluoromethyl sulfonylimide (TFSI), acetate (Ac), hydroxide (OH), and diethyl phosphate (DEP).

6. The electrolyte membrane of claim 2, wherein the additive comprises one or more selected from the group consisting of cesium iodide (CsI), lithium iodide (LiI), lithium nitrate (LiNO$_3$), and ammonium (NH$_4$).

7. The electrolyte membrane of claim 1, wherein the polymer is used in an amount of about 20 to 200 parts by weight based on 100 parts by weight of the ionic liquid.

8. The electrolyte membrane of claim 1, wherein the lithium salt is used in an amount of about 10 to 100 parts by weight based on 100 parts by weight of the ionic liquid.

9. The electrolyte membrane of claim 2, wherein the additive is used in an amount of about 0.1 to 10 parts by weight based on 100 parts by weight of the ionic liquid.

10. The electrolyte membrane of claim 1, wherein the reinforced membrane has a porosity of about 30 to 95%.

11. The electrolyte membrane of claim 1, wherein the reinforced membrane has a thickness of about 3 to 100 μm.

12. The electrolyte membrane of claim 1, wherein a contact angle of the electrolyte solution with the reinforced membrane is about 5 to 90°.

13. The electrolyte membrane of claim 1, wherein the electrolyte membrane has a thickness of about 5 to 200 μm.

14. A lithium air battery, comprising:
a cathode;
an anode; and
the electrolyte membrane of claim 1 disposed between the cathode and the anode,
wherein the electrolyte membrane comprises a cathode side facing the cathode and an anode side facing the anode,
the electrolyte membrane is folded in a zigzag form,
the cathode is stacked by being inserted into folds of the cathode side of the electrolyte membrane,
the anode is stacked by being inserted into folds of the anode side of the electrolyte membrane, and
the cathode, the anode and the electrolyte membrane are provided in a case.

15. The lithium air battery of claim 14, wherein the case comprises a first side and a second side opposite the first side, and the case comprises openings in the first side and the second side so as to allow external air to pass therethrough, and
the external air is allowed to flow into and out of the case in a direction crossing a direction in which the cathode, the anode and the electrolyte membrane are stacked.

16. The lithium air battery of claim 14, wherein the cathode comprises a porous substrate, and
a length of the electrolyte membrane is equal to or less than a length of the porous substrate included in the cathode.

* * * * *